Feb. 28, 1956 — P. J. FRICKERT, JR — 2,736,676
FIBROUS MATS AND PRODUCTION THEREOF
Filed April 24, 1953 — 4 Sheets-Sheet 1
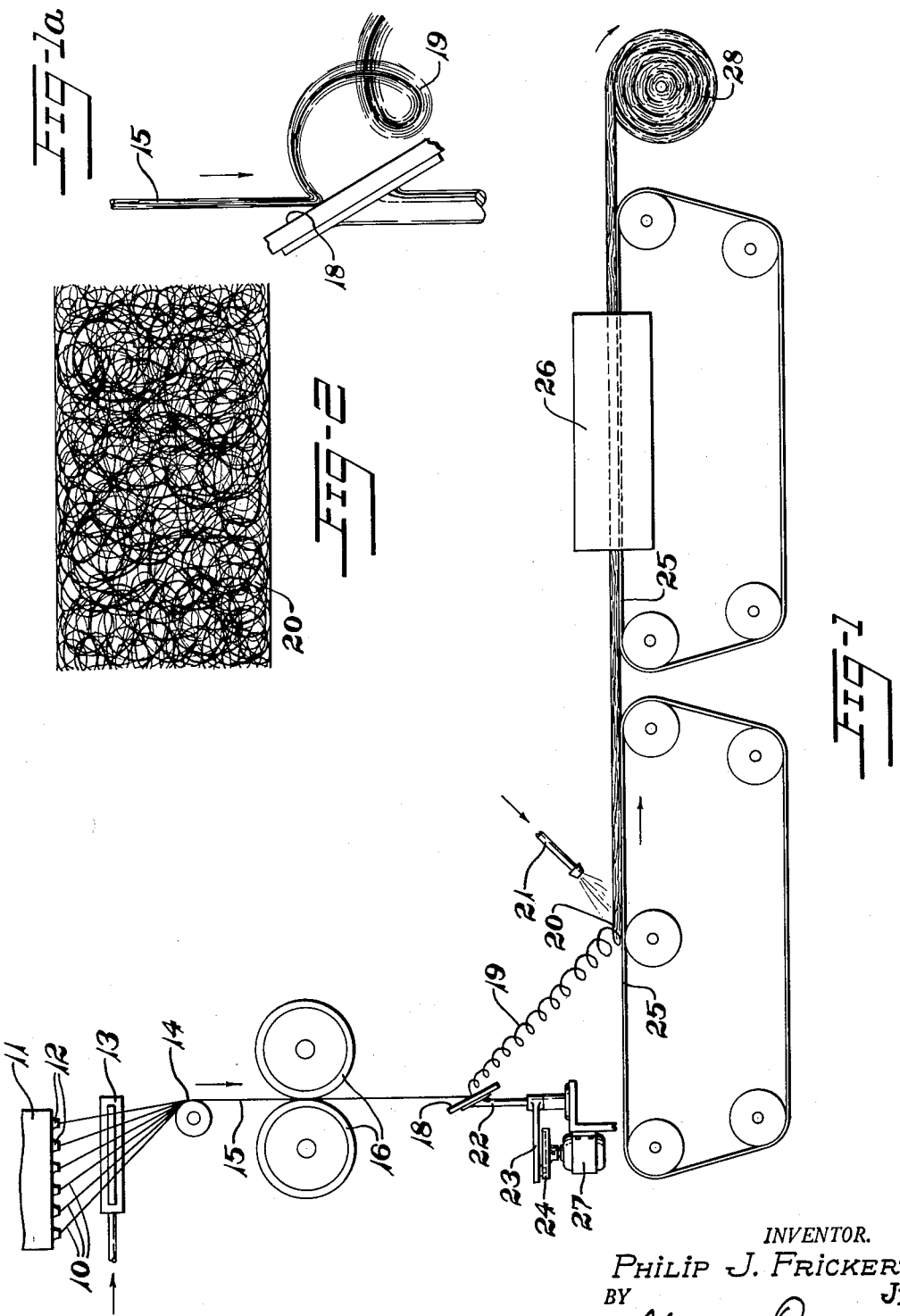

Feb. 28, 1956  P. J. FRICKERT, JR  2,736,676
FIBROUS MATS AND PRODUCTION THEREOF
Filed April 24, 1953  4 Sheets-Sheet 2
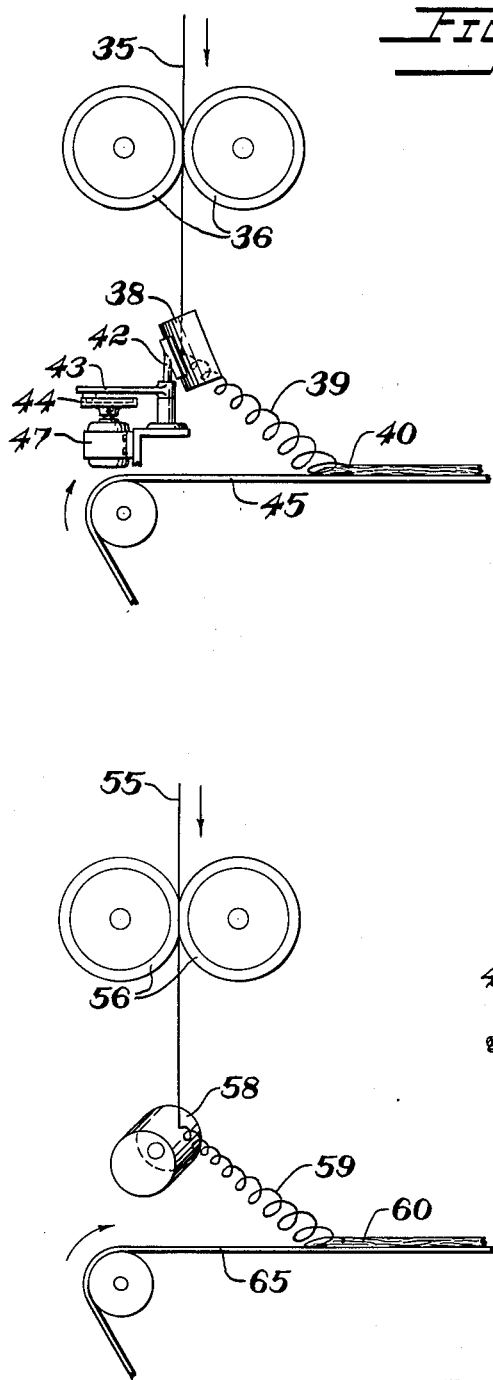
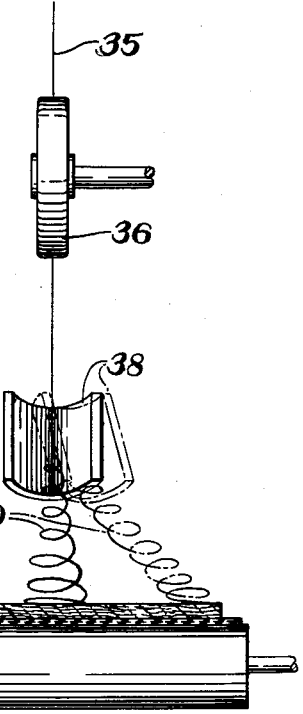
INVENTOR.
PHILIP J. FRICKERT JR.
BY
ATTYS.

Feb. 28, 1956 P. J. FRICKERT, JR 2,736,676
FIBROUS MATS AND PRODUCTION THEREOF
Filed April 24, 1953 4 Sheets-Sheet 3
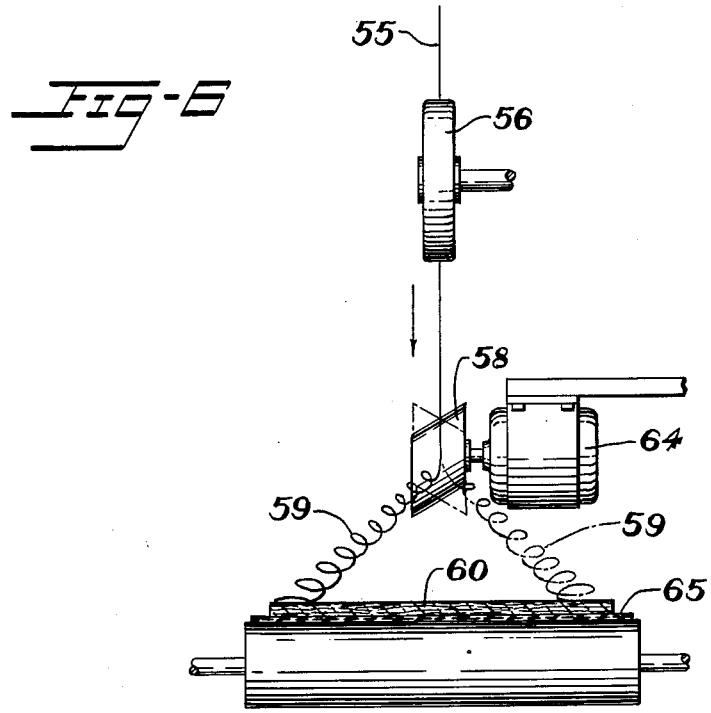
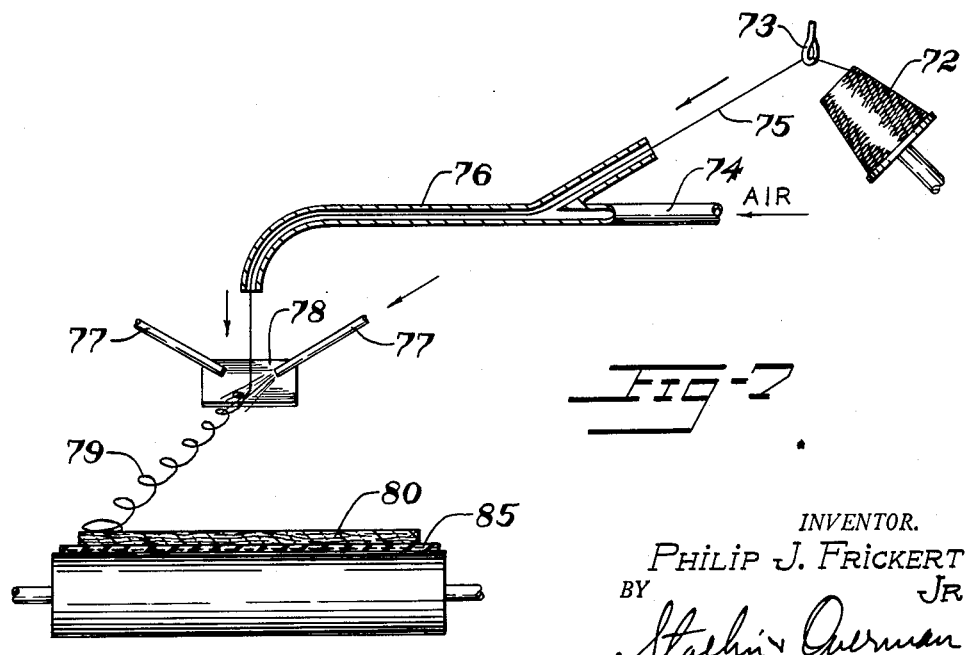
INVENTOR.
PHILIP J. FRICKERT JR.
BY
ATTYS.

Feb. 28, 1956 P. J. FRICKERT, JR 2,736,676
FIBROUS MATS AND PRODUCTION THEREOF
Filed April 24, 1953 4 Sheets-Sheet 4

INVENTOR.
Philip J. Frickert Jr
BY
ATTYS.

United States Patent Office 2,736,676
Patented Feb. 28, 1956

2,736,676

FIBROUS MATS AND PRODUCTION THEREOF

Philip J. Frickert, Jr., Harbor Hills, Hebron, Ohio, assignor to Owens-Corning Fiberglas Corporation, a corporation of Delaware Application April 24, 1953, Serial No. 351,000

22 Claims. (Cl. 154—54)

This invention relates to sheets or mats made of fibers in strand form and more particularly to a new fibrous mat product made of glass strands provided with a self-integrating property.

Due to increased general use of fibrous glass mat products, need has arisen for more exacting characteristics and properties for specific applications. Fibrous glass mats have been put to use for such purposes as acoustical, electrical, and thermal insulation, as well as for reinforcing and filtering purposes, each such application requiring certain characteristics of strength, porosity and integrity.

One method by which glass fibers for mats can be produced is to mechanically attenuate a plurality of glass streams flowing from a feeder or bushing. Attenuation of the streams may be effected by pulling rolls or wheels such as are shown in the Drummond application Serial Number 199,524, filed on December 6, 1950, which draw the streams into fine fibers or filaments as they solidify by reason of exposure to the atmosphere. The solidified filaments are drawn over a size applicator and are then gathered into strand form whereupon the pulling wheels supply the strand for the purpose desired.

Another method of manufacturing glass fibers involves flowing the glass from a feeder as described above and directing a jet of gas thereagainst at high speed to attenuate the streams into fine fibers by disrupting them into varied lengths which collect as a pulpy mass.

Sheet and mat products have been manufactured in the past of both types of glass fibers but strand mats have presented a greater difficulty in manufacture because of their limited ability to form an integral mass. More specifically, the strand has little tendency to intermingle with itself so as to promote formation of an integral mass such as in a mat product. Heretofore, it has been necessary to add agents such as extra quantities of binder material or additional glass fibers of shorter length in order to promote mat integrity. These additions, however, involve additional process steps and corresponding added equipment complexity and cost.

In addition to the problem of integrity, other difficulties are experienced with strands in that of themselves they lack the ability to give the degree of fine porosity desired for uses such as acoustical, electrical, and thermal insulation. That is, continuous strands by themselves usually fail to provide the multitude of small interstices desired in such insulation materials. Further in this regard, mats made wholly of strand, because of their usually large interstices, are somewhat rough and fail to provide the fine finish and appearance desired when glass mats are put to use as reinforcement material in resin laminate structures.

It is particularly desirable to incorporate continuous glass strands in mat products, however, because the mechanically attenuated fibers of which such strands are composed have much greater strength than the blown fibers. Mechanically attenuated fibers are known to have tensile strengths much greater than blown fibers. Such additional strength incorporated in fibrous mats lends greatly to permitting their use in many installations in which they could not otherwise be used. Both burst and tear strengths of such mats can be made extremely high by reason of the high strength of the fibers or filaments embodied in the strands.

In view of the foregoing, it is an object of the present invention to provide a novel and economical method and means for manufacture of glass strand mats having a high degree of integrity and strength.

Another object of the invention is to provide a new type of glass strand mat having a high degree of integrity and strength and a controllable degree of porosity.

A further object of the invention is to provide an efficient method and means for imparting a felting property to glass strands to promote integrity in accumulations thereof.

Still another object of this invention is to produce a novel strand product capable of providing a large number of interstices and a fine finish in accumulations thereof.

A still further object of the invention is to provide a more efficient method and means than existed heretofore for manufacturing mat products of materials in strand or yarn form.

During a program of search for a characteristic of glass strands which would aid in attaining the foregoing objectives and at the same time overcome the limitations of glass strands, it was discovered that such strands had the peculiar characteristic of acquiring a fluffed or fuzzy property when driven against a hard surface. That is, it was found that when an integral glass strand is moved at relatively high speed and directed against a hard surface so that it impinges such surface with a driving force, the product produced is a strand of fuzzy or fluffed character which tends to take on a curl resulting in a generally helical form or swirl. The greater the speed of impingement, the greater the fuzziness created.

Upon closely examining a fuzzed strand of this type, it is seen that at each point along the length of the strand, several of the filaments therein are dispersed or separated from the main core along at least a portion of their length while the remainder are retained in integrated form. In other words, the strand integrity is disrupted to the extent that a portion of the filaments have been dispersed from the center of the strand for a portion of their length. Since these filaments are extremely fine, running in the order of .00023 to .00075 inch in diameter, they establish a fuzzed or felted character when thus individualized.

The strength properties of a strand which has been disrupted in this manner, it has been found, are negligibly affected. Further, the fuzz or felt characteristic provides an attribute which promotes mass integrity when the strand is gathered or accumulated. The dispersion of filaments promotes an intermingling and clinging of the strand portions which overlap and cross, or otherwise contact each other, so as to produce a gathering of filaments and strand into a cohesive mass. In addition, the intermingling and clinging causes the formation of a multitude of small interstices desired in insulation products, and also provides a fine outer finish which is often desired when such a product is used as reinforcement such as in resin laminate structures.

An important feature of this method of filament dispersion is that it readily lends itself to an efficient means of distribution into desired products. More specifically, the forces of impingement, beside effecting filament dispersion, may also be used to deflect the strand from the hard filament-dispersing surface into a strand accumulation of desired form. The strand may be deflected in a sweeping manner onto a conveniently located conveyor on which it may be collected in mat form. The deflection to the conveyor is accomplished by inclining the dispersing or deflecting surface with respect to the path of motion of the strand and in the direction of the area of accumulation.

To effect a sweeping action to cause accumulation of the strand across the width of the conveyor, the dispersing or deflecting surface is merely oscillated in a lateral direction, first to one side and then the other, whereby the strand is correspondingly deflected to and fro across the conveyor. By causing the conveyor to move continuously forward at an appropriate rate of speed the accumulation across its width takes on the form of a longitudinal mat.

Although the principles of the present invention are described as applied in the use of glass strands, the invention is not limited thereto in view of the fact that it has aspects readily applicable to use with strands, yarns and other forms of different materials. For example, the described method of effecting strand distribution can be used for distribution of yarns or slivers as well, or may be used for distribution of strands, yarns or slivers of materials such as cellulose acetate, artificial silk, cotton, wool or nylon.

Other objects and features which I believe to be characteristic of my invention are set forth with particularity in the appended claims. My invention, however, both in organization and the manner of construction together with further objects and advantages thereof may be best understood by reference to the following description taken in connection with the accompanying drawings in which:

Figure 1 is a schematic side-elevational view of mat-making apparatus embodying principles of the present invention;

Figure 1a is an enlarged view in part of the deflecting member of Figure 1 illustrating a strand impinging thereagainst and being deflected in dispersed form;

Figure 2 is a plan view of a piece of strand mat produced in accordance with the present invention showing, in general, the swirl and looped appearance imparted thereto;

Figure 3 is a side-elevational view of apparatus for manufacturing strand mats in accordance with the invention showing another form of deflecting surface capable of efficiently distributing a strand into desired form;

Figure 4 is an enlarged front-elevational view of the mat-making apparatus shown in Figure 3;

Figure 5 is a side-elevational view of mat-making apparatus incorporating still another form of deflecting surface for distributing a strand in desired form;

Figure 6 is a front elevational view of the apparatus shown in Figure 5;

Figure 7 is a partially schematic elevational view of another embodiment with which strand mats are manufactured in accordance with the present invention;

Figure 8:
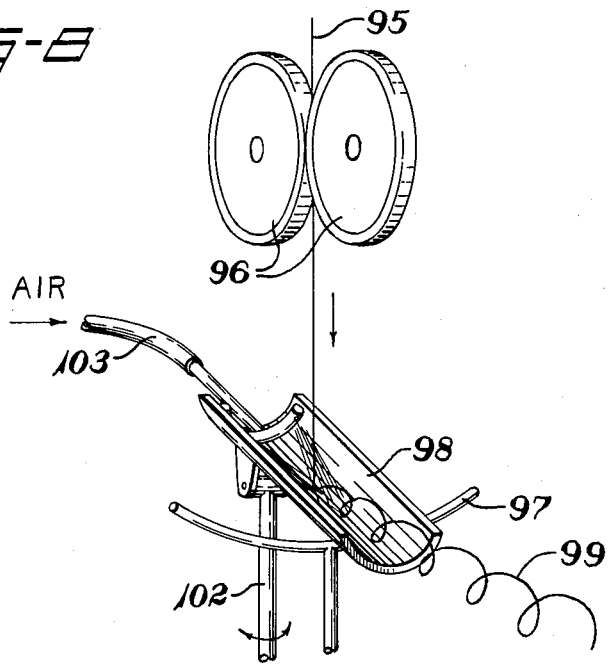
Figure 8 is a partially schematic perspective view of still another apparatus assembly embodying principles of the invention for making strand mats in accordance with this invention.

Referring to the drawings in greater detail, Figure 1 shows apparatus for making mat in accordance with this invention. The glass filaments 10 are drawn into the form of an integral strand 15 under the influence of a pair of pulling wheels 16 which impart linear velocity to the strand sufficient to deflect it from a filament-dispersing member 18 onto a conveyor 20. The filaments are formed of molten glass at feeder 11 which feeds the glass through orifices in its tips 12. They are drawn over a roller-type size applicator 13 of conventional design which coats the filaments with sizing such as water, starch or gelatine before they are gathered into strand form at a gathering shoe 14. The pulling wheels 16 which impart motion to the strand are of a type illustrated and described in the aforementioned copending Drummond application, Serial Number 199,524. The strand 15 is drawn downwardly by the wheels to attenuate the filaments at the feeder. The wheel speed is arranged to be such as to impart motion to the strand with sufficient kinetic energy to disperse at least a portion of the filaments in the strand upon impingement against the member 18 as well as to deflect the strand in the direction in which member 18 is inclined. The kinetic energy within the strand after impact is diminished somewhat, causing the speed of emission to be correspondingly reduced. This fact, in addition to the fact that the dispersed strand tends to fuzz and curl, causes it to take on a somewhat helical configuration after impingement as shown in Figure 1a. Although the fuzzed strand 19 takes on a configuration other than straight after impingement, it still follows a generally straight path dependent upon the direction in which the deflecting member is faced.

Thus, in order to make the mat of width greater than that of the strand configuration, the member 18 is cyclically oscillated across the width of the conveyor line to lay a mat product of the type shown in Figure 2. The thickness of mat 20 is dependent upon the speed of the conveyor as well as the speed of emission of the dispersed strand 19. In order to make a thicker mat, either the linear speed of emission of the strand 19 is increased, or the conveyor 25 is reduced in speed. The combination of these two speed control factors, of course, permit production of even a thicker mat product.

The sweep action resulting in oscillation of the member 18 back and forth across the conveyor belt or chain 25 can be accomplished by a number of methods but as an illustration of one of these methods, the member 18 is supported on a vertical shaft 22 which is integrally associated with a cam follower arm 23 arranged to be actuated by a follower-cam 24 driven by motor 27. The pattern of the groove set in the follower-cam 24 is made such as to oscillate the member 18 at a rate which effects uniformity of distribution of the strand 19 without creating thicker or thinner mat portions, such as for instance, might be caused by a lingering of the member 18 at extreme side positions.

After collection of the strand into an accumulation of desired width and thickness, a binder is applied by such means as a binder spray 21. The binder material may be any of a number of materials that will effect a desired bonding action such as phenol formaldehyde, polystyrene, starch, acrylic resins, etc. The mat is thereupon further conveyed over the belt 25 and then introduced into a curing oven 26 where it is heat cured to establish stable physical characteristics. Following curing, the mat may be made ready for shipment or further use by winding it into a roll 28.

The properties of mats produced in this manner may be closely governed over a considerable range of characteristics by changing the proportion of filaments within the strand which are dispersed before introduction into the mat. For instance, the strand may be arranged to be deflected without dispersion to produce mats made completely of integral strand. A mat product of this kind has large interstices and correspondingly is relatively coarse yet provides the high twist and tear strengths which prove highly desirable for reinforcement purposes. If, however, the strand incorporated in the mat has dispersed filaments in accordance with the present invention, then the interstices therein are more numerous and considerably smaller, producing a product desirable for insulation purposes.

The number of filaments dispersed within the deflected strand has been found controllable by adjusting the angle of impingement of the strand against the deflecting surface as well as by regulating speed of the strand.

In addition, the degree of dispersion of the strand is controllable by the amount of fluid applied at the applicator.

It has been found that the closer the angle between the strand and the deflecting surface is to 90° the greater is the amount of dispersion produced. That is, if the strand impinges the surface in a path directly perpendicular to the surface, the greatest amount of strand dispersion is effected for a given speed. With such impingement, however, the strand fails to be deflected and merely piles up in a form requiring further treatment to place it in useable form. To permit accumulation of the dispersed strand in a more convenient form, the deflecting surface is tilted in the manner of the deflecting member 18. Tilting this surface at too small an angle with respect to the strand, however, reduces the amount of dispersion. For instance, if a zero angular disposition were to be provided, between the strand and deflecting plate, the plate surface would be parallel to the path of movement of the strand and no impingement or dispersion of filaments could be effected. Thus, some angular disposition between 0° and 90° may be found for each specific need for filament-dispersed strand. Another characteristic determining angle of impingement is the pattern desired in the final product. The closer the angle is to 90°, the tighter or smaller is the curl formed in the accumulation.

As an illustration of quantitative proportions here given by way of example only and not by way of limitation, a 204 filament integral strand having a linear speed of 8,000 feet per minute, may have 10% of its filaments dispersed upon impingement. A greater number of filaments, of course, are controllably dispersed at higher speeds.

Upon initial collection of the deflected strand with its dispersed filaments, it is a fluffy product, particularly if the amount of filament dispersion is great. As pointed out, the degree of fluffiness may be controlled by regulating the degree of filament dispersion in the deflected strand. If it is desired to compact the fluffy accumulation in the mat, however, water or other fluids may be sprayed thereon as the mat is formed and before being sent through the curing operation. An upper compression roll or top flight may also be used to compact the strand accumulation on the conveyor before or during the curing operation. If the fibrous glass and resin are accumulated without intermediate compacting steps being effected, a fluffy product is obtained having excellent properties adapted to many insulating applications.

As pointed out, the degree of filament dispersion is also controllable by the amount of moisture transferred to the strand at the size applicator 13. It has been found that, beyond a certain point determinable by trial with each type of strand, the more fluid applied to the filaments, the lesser is the per cent of filament dispersion effected upon impingement with the deflecting surface.

It should be noted that at the time of impingement, the strand is often sufficiently moist to cause an accumulation of moisture on the impinged surface. Although the accumulation in some instances would be sufficient to prevent efficient filament dispersion and strand deflection, it has been found that this condition may be readily remedied by heating the impinged member to drive off excess moisture. Heating may be accomplished by direct application of a flame on the under side of the member or by such means as flow of electrical current through the member. Air directed against the impinged surface of the member in a manner similar to that disclosed hereafter in embodiments of Figures 7 to 9 may also be conveniently used to maintain the desired degree of moisture freedom at the impinged surface.

Figures 3 and 4 illustrate another embodiment of the invention in which a deflecting member or plate 38 is arcuate in form to effect a straighter and more even distribution of the dispersed strand 39 across the width of the mat 40. The deflecting member is a semicircular channel angularly mounted on an oscillating shaft 42 driven by a cam follower arm 43 which in turn is caused to oscillate by the rotation of the follower cam 44. The follower cam, as in the embodiment of Figure 1, is patterned to oscillate the member 38 at a cyclic rate effecting uniform distribution of the dispersed strand 39 deflected therefrom. The follower cam 44 is driven by a direct-drive motor 47.

The integral strand 35 is drawn downwardly by the puller wheels 36 which impart a motion to the strand sufficient to deflect it from the member 38 and simultaneously disperse filaments therein. The deflected strand after impingment against the deflecting surface, is introduced to the mat 40 collected on the conveyor 45.

By reason of the curvature of the deflecting member 38, it need be moved through only a small angle during oscillation to effect full sweep distribution of the strand. With the slightest lateral motion of the member, the angle of sweep of the impinging strand is changed much more than is possible by similar motion with a flat member. This occurs both by reason of a change in direction of the member as well as by reason of a change in direction of the arcuate surface against which the impingement is effected. Beside permitting wide distribution with lesser motion of the deflecting member 38, its arcuate form also promotes greater uniformity. That is, as the member swings laterally, it presents a surface portion to the impinging strand which is slightly higher and forward of its central portion, thus causing the deflected strand to be thrown further when deflected in the direction of the edges of the mat than when directed toward the center. In this manner, the line across the width of the mat on which the strand is collected is substantially straight rather than arcuate as might be expected with the straight deflecting member as used in the embodiment of Figure 1. A straighter and more uniform accumulation of dispersed strand across the width of the mat is thereby assured.

Figures 5 and 6 illustrate still another embodiment of this invention in which strand 55 drawn by wheel pullers 56 is arranged to impinge against a drum diagonally mounted on a horizontal axis. As in the previous embodiment, the strand is arranged to impinge against the drum 58 with sufficient impact to deflect it as well as to disperse filaments contained therein, thereby producing a pulled strand 59 which is collected on conveyor belt 65 in the form of a mat 60. As illustrated in Figure 6, as the drum or cylinder 58 is rotated by drive motor 64, it presents a deflecting surface which alternates in angular disposition so that the strand is first deflected to one side and then to the other. The strand is thus swept back and forth across the width of the conveyor to produce the mat 60. Impingement of the strand against the drum is made to be slightly forward of the horizontal axis on which it rotates, thereby effecting a change in the direction in which a line drawn perpendicular to the face of the drum at the point of impingement is directed during rotation. In other words, the direction faced by the impinged area of the drum 58 during successive instants of rotation is changed constantly in accordance with the cycle of motion determined by the shape and axis of rotation of the drum thereby correspondingly changing the angle of deflection to produce a sweeping action.

Figure 7 shows a still further embodiment of the invention in which pulling wheels are replaced by a pneumatic tube 76 which draws the strand 75 through an eye 73 from a strand package 72. The strand-driving air is introduced at the side of the path of travel taken by the strand 75 and carries the strand with it through the tube to impart velocity thereto sufficient to drive the strand against the deflecting surface 78. The deflecting plate or member 78 is in this instance arranged to be stationary to direct the strand a given distance forward into the mat 80 for collection on the conveyor belt 85. Lateral sweeping of the strand from the deflecting member 78 is effected by air blown from pneumatic tubes or nozzles 77 which operate alternately to first deflect the dispersed strand 79 to one side and then to the other. A feature of this embodiment lies in the fact that as the strand is directed to one side, the air emitted from the tube blowing it to that side also acts to aid the forces of impingement to throw it further forward at the extreme edges of the mat. In this way, the line of collection of strand into the mat is again made substantially straight as in the embodiment of Figures 3 and 4. Another feature of this embodiment lies in the fact that it has no moving parts except the conveyor and the spindle from which the strand package 72 is unwound.

Figure 9:
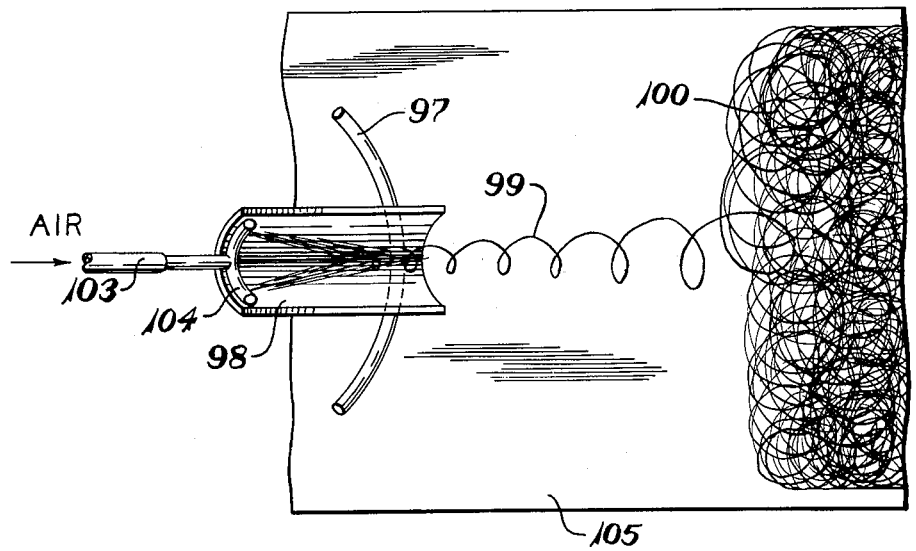
Figure 9 is a plan view in part of the apparatus of Figure 8.

Figures 8 and 9 illustrate another embodiment in which wider distribution of strand is effected by making the strand deflecting surface 98 pivotal in a vertical direction and by providing a curved guide rod 97 for raising and lowering the deflecting surface as it oscillates back and forth in a lateral direction. With such an arrangement, the deflected strand 99 impinges the surface at a slightly different relative angle when the strand is directed to the sides of the mat 100 than when directed toward the center thereof. In other words, the deflected strand is thrown a greater distance from the deflecting surface when directed to the marginal portions adjacent to the edges of the mat. The integral strand 95 is drawn by pulling wheels 96 and directed against the deflecting member 98 which produces a dispersed strand 99 for mat 100 which is formed on the conveyor line or belt 105. The deflecting member 98 is pivoted on the laterally oscillating drive shaft 102. As the deflecting member is swept laterally in either direction from its center, it is lifted slightly by the guide rod 97, causing the angle of deflection of the strand to be varied with respect to the horizontal and causing the strand to be thrown a greater distance at the edges. In this way the width of the mat can be made greater with a given deflecting member and strand speed.

To further aid in throwing the deflected strand a greater distance from the point of impingement, air jets are provided just behind the point where the strand impinges the deflecting surface. The jets are emitted from a tube 104 and are directed strategically to give greater travel force to the dispersed strand as it leaves the deflecting surface, thus causing a further throwing of the strand to points otherwise too difficult to attain without extremely high speeds of impingement. Air is supplied from an external source, not shown, to a supply tube 103 to form the air jets desired. As shown, the jet orifices are conveniently located in the tube ends and are directed from behind and slightly to one side of the point of impingement to catch the deflected strand with the most efficient transfer of energy of motion to the strand. Beside aiding in throwing the strand a greater distance, the air jets also act to stretch out the helical configuration of strand 99 to form smaller swirls in the final mat product.

While the invention has been shown in connection with certain preferred embodiments thereof, it is apparent that numerous variations and modifications may be made, and it is contemplated in the appended claims to cover all such variations and modifications as fall within the true spirit and scope of the invention.

I claim:

1. The method of controllably imparting a felting property to an untwisted strand of continuous glass filaments comprising the steps of imparting a linear motion to such strand, causing said strand to impinge a hard surface, and to regulate the velocity imparted to the strand to effect the desired degree of fiber dispersion.

2. The method of controllably imparting a felting property to an untwisted fibrous glass strand comprising the steps of imparting a high velocity motion to such strand, causing said strand to impinge a hard surface, and to angularly fix the surface to effect the desired degree of fiber dispersion.

3. The method of controllably imparting a felting property to an untwisted fibrous glass strand of continuous fibers during the strand forming process comprising the steps of imparting a high velocity motion to such strand, causing said strand to impinge a hard surface, and to fix the amount of sizing fluid applied to the fibers during forming to effect a general dispersion of fibers to a desired degree at successive points along the length of the strand.

4. The method of making a product of an untwisted filamentous glass strand comprising imparting high velocity motion to said strand in the direction of a deflecting surface at a rate sufficient to disperse at least a portion of the filaments therein upon impingement against said surface as well as to angularly deflect the strand therefrom in another direction to a predetermined collection area.

5. Apparatus for manufacture of mats from matter in strand-like form comprising means for imparting high velocity motion to such matter, a pivoted deflection member having an inclined deflection surface disposed in the path of travel of said matter, said motion imparting means being capable of moving said strand linearly with sufficient velocity to cause its deflection from said surface and means for cyclically varying the lateral direction in which said surface faces about its pivot axis, said surface being arcuately shaped whereby the angle of deflection of said matter from the member is varied by the arcuate contours of the member as well as by the variation of the direction in which the member is faced.

6. Apparatus for manufacture of mats from matter in strand-like form comprising means for imparting high velocity motion to such matter, a rotary deflection member disposed in the path of travel of said matter, said member having a peripheral surface varying in angular disposition with respect to its axis of rotation in accordance with a predetermined pattern for a desired cyclic variation in angular deflection of the strand on rotation of the member.

7. Apparatus for distribution of matter in strand-like form for incorporation in a mat product comprising, means for imparting high velocity motion to such matter, a stationary deflection member disposed in the path of travel of said matter, pneumatic blowers laterally disposed on opposite sides of the point of impingement of said matter with said member, and means for effecting alternate operation of said blowers to produce a sweep distribution of the matter deflected from said member in a direction generally transverse to the path of travel of said matter.

8. Apparatus for distribution of matter in strand-like form for incorporation in a mat product comprising, means for imparting high velocity motion to such matter, a deflection member disposed in the path of travel of said matter, pneumatic blowers, laterally disposed on opposite sides of the point of impingement of said matter with said member, said blowers being located slightly behind the point of impingement and arranged to direct pneumatic jets generally toward the point of impingement, and means for effecting alternate operation of said blowers to produce a sweeping distribution in a direction generally transverse to said path of travel as well as to aid the propulsion of matter deflected from said member.

9. Apparatus for manufacture of mat products from matter in strand-like form comprising means for imparting high velocity motion to such matter, a deflection member having vertical and horizontal pivot axes, and having a surface disposed in the path of travel of said matter, means for cyclically varying the lateral disposition of said member about its vertical pivot axis to produce a lateral sweep distribution of matter deflected therefrom, and associated means for cyclically varying the angular disposition of said member on its horizontal axis to effect a wider and linear distribution of said matter.

10. Apparatus for manufacture of mats of fibrous material comprising means for imparting high velocity motion to such material, a deflection member angularly disposed in the path of travel of said material, pneumatic blower means directed generally transversely to said path of travel behind the point of impingement of said material with said member to aid propulsion of material deflected from said member to predetermined points of collection.

11. Apparatus for manufacture of mats of matter in continuous strand-like form comprising means for imparting high velocity motion to a continuous strand, a member having a deflecting surface disposed in the path of travel of said matter, said motion imparting means being capable of moving said strand in an axial direction to impinge said surface with sufficient velocity to effect a deflection thereof under its own inertia of motion to predetermined points of collection, and means for cyclically varying the orientation of said deflecting surface relative to the path of said strand to effect distribution thereof in accordance with a predetermined sweep pattern.

12. As an article of manufacture a mat made of an untwisted strand of continuous filaments in which at least a portion of the filaments are dispersed by being spaced from each other at each point along the length of the strand while the remainder of the filaments are integrally associated in closely compacted relation.

13. As an article of manufacture a fibrous mat comprising an untwisted strand of continuous filaments, said strand having at each point along its length a portion of said filaments closely associated in an integral core, and the remainder of said filaments being dispersed in individually spaced relation from said core, said strand being distributed through said mat in the form of random overlapping loops establishing an intermingling felted relationship between dispersed filaments and strand portions.

14. A fibrous glass mat comprising a continuous untwisted strand distributed through the length, width and depth of said mat, said strand comprising a plurality of continuous glass filaments grouped in generally parallel relation and having at each point along its length at least a portion of said filaments dispersed in spaced relation from the cross sectional center of the strand to impart a fuzzed character thereto, said strand being distributed through said mat in the form of random overlapping loops, and a bonding material distributed throughout the mat to interbond the filaments and strand portions located in close proximity and in contacting relationship with each other.

15. A fibrous mat comprising a mass accumulation of intermingling swirled portions of at least one untwisted filamentous strand of continuous glass fibers, the cross section of the strand at substantially all points along its length having at least a portion of the filaments therein individually dispersed from the center of the strand.

16. A method for imparting a fuzzed property to an integrated untwisted strand of continuous filaments comprising moving said strand relative to a hard surface and impinging said surface with sufficient velocity to cause a dispersion from the center of said strand at successive adjacent points along the length of said strand of at least a portion of the filaments therein.

17. A method for introducing a fibrous strand into a product comprising the steps of imparting a high velocity axial motion to the strand, directing said strand after it leaves the motion-imparting instrumentality against a deflecting surface spaced from said instrumentality with sufficient velocity to deflect the strand from said surface, and cyclically varying the direction toward which the deflecting surface faces to effect deflection of the strand from said surface to predetermined points of accumulation.

18. The method of making a continuous strand mat of one or more strands of untwisted, parallelly grouped, continuous glass filaments comprising the steps of imparting to each such strand a linear motion toward a deflecting surface of such velocity as to cause at least a portion of the fibers therein to be dispersed as well as to cause the strand to be deflected from said surface, and to vary the direction of deflection in accordance with a predetermined cycle to effect a desired distribution thereof in the form of a mat.

19. Apparatus for producing mat products incorporating material in continuous strand form comprising means for imparting high velocity motion to a continuous strand, means comprising a surface angularly related to the path of said strand against which said strand is arranged to impinge, said motion imparting means being capable of moving said strand with sufficient velocity to cause its deflection from said surface, and means for varying the orientation of said deflection surface with respect to said path of the strand in accordance with a predetermined cycle of variation to effect distribution thereof in a direction generally transverse to said path.

20. Apparatus for producing mat products incorporating material in continuous strand form comprising means for imparting high velocity motion to a continuous strand, a pivoted member comprising a hard surface angularly disposed in the path of travel of said strand, said motion imparting means being capable of moving said strand with sufficient velocity to cause its deflection from said surface for appreciable distances from said member and means for cyclically varying the lateral orientation of said member about its pivot to effect a sweeping distribution of the deflected strand.

21. The process of making mat products containing glass fiber strands comprising flowing streams of molten glass, drawing out the streams into continuous fibers and gathering them into a continuous untwisted strand, applying a sizing fluid to the fibers as they are formed and before they are gathered into a strand, imparting a high velocity axial motion to said strand, directing said strand along path against a deflecting surface at sufficient velocity to deflect the strand therefrom, and cyclically varying the direction toward which the deflecting surface faces to effect deflection of the strand from said surface to predetermined points of accumulation extending in a direction generally transverse to said path.

22. Apparatus for making fibrous glass mats comprising a feeder for flowing a plurality of streams of molten glass, attenuating means for drawing said streams into continuous fibers, a gatherer spaced from the feeder for gathering the fibers together into an untwisted strand as they are attenuated, means located in the path of the fibers for applying a sizing fluid to said fibers to provide sizing fluid thereon at said gatherer, said attenuating means being adapted to impart a high velocity to said strand along its linear axis, means comprising a surface inclined to the path of said strand against which said strand is arranged to impinge, the attenuating means being capable of imparting sufficient velocity to said strand to cause a deflection therefrom, means for varying the orientation of said surface with respect to said strand to effect distribution thereof in a direction generally transverse to said path of the strand, and linearly moveable collection surface means on which the deflected strand be laid progressively as a mat.

References Cited in the file of this patent

UNITED STATES PATENTS

| | | |
|---|---|---|
| 2,392,882 | Roberts | Jan. 15, 1946 |
| 2,509,845 | Slayter | May 30, 1950 |
| 2,577,214 | Slayter | Dec. 4, 1951 |
| 2,610,893 | Collins et al. | Sept. 16, 1952 |
| 2,638,146 | Rounseville et al. | May 12, 1953 |